(12) United States Patent
Okutan et al.

(10) Patent No.: US 11,632,386 B2
(45) Date of Patent: Apr. 18, 2023

(54) CYBERATTACK FORECASTING USING PREDICTIVE INFORMATION

(71) Applicants: Ahmet Okutan, Rochester, NY (US); Shanchieh Jay Yang, Penfield, NY (US); Katie McConky, West Henrietta, NY (US)

(72) Inventors: Ahmet Okutan, Rochester, NY (US); Shanchieh Jay Yang, Penfield, NY (US); Katie McConky, West Henrietta, NY (US)

(73) Assignee: Rochester Institute of Technology, Rochester, NY (US)

( * ) Notice: Subject to any disclaimer, the term of this patent is extended or adjusted under 35 U.S.C. 154(b) by 371 days.

(21) Appl. No.: 16/898,618

(22) Filed: Jun. 11, 2020

(65) Prior Publication Data

US 2021/0021631 A1 Jan. 21, 2021

Related U.S. Application Data

(60) Provisional application No. 62/876,291, filed on Jul. 19, 2019.

(51) Int. Cl.
*H04L 9/40* (2022.01)
*G06N 20/00* (2019.01)
*G06N 5/04* (2023.01)

(52) U.S. Cl.
CPC .......... *H04L 63/1433* (2013.01); *G06N 5/04* (2013.01); *G06N 20/00* (2019.01)

(58) Field of Classification Search
CPC ............... H04L 63/1433; H04L 63/164; H04L 63/0272; G06N 20/00; G06N 5/04
See application file for complete search history.

(56) References Cited

U.S. PATENT DOCUMENTS

| 7,412,721 B2* | 8/2008 | Torii | H04L 63/1441 |
| | | | 726/25 |
| 8,191,149 B2* | 5/2012 | Yun | G06F 21/552 |
| | | | 726/25 |

(Continued)

FOREIGN PATENT DOCUMENTS

| CN | 113660225 A | * 11/2021 | |
| WO | WO-2014112185 A1 | * 7/2014 | G06F 11/34 |

(Continued)

OTHER PUBLICATIONS

Fang, X., et al., "A deep learning framework for predicting cyber attacks rates," EURASIP Journal on Information Security, https://link.springer.com/article/10.1186/s13635-019-0090-6#Sec1 (accessed Jun. 10, 2020).

(Continued)

*Primary Examiner* — Sarah Su
(74) *Attorney, Agent, or Firm* — Bond Schoeneck & King, PLLC; Joseph M. Noto

(57) ABSTRACT

A computerized method and system for predicting the probability of a cyberattack to a target entity, includes: collecting a plurality of predictive signals to a target entity for a specific cyberattack type; optionally, imputing a value for missing values of the collected signals; selecting a set of relevant non-redundant signals from the collected signals to create lagged signals; identifying from the lagged signals relevant data chunks to form a custom training set of signals; providing selected ground truth data related to the specific attack type for the target entity; training a forecasting model using the custom training set of signals together with the selected ground truth data related to the specific attack type for the target entity to generate a trained forecasting model; providing a second set of signals of the same type of signals as the custom training set of signals; and generating the (Continued)

probability of the specific attack type of interest against the target entity by inputting the second set of signals into the trained forecasting model.

18 Claims, 9 Drawing Sheets

(56) References Cited

U.S. PATENT DOCUMENTS

| | | | |
|---|---|---|---|
| 8,839,440 B2* | 9/2014 | Yun | H04L 63/1433 726/13 |
| 9,306,965 B1 | 4/2016 | Grossman et al. | |
| 9,948,663 B1* | 4/2018 | Wang | H04L 63/1416 |
| 10,248,910 B2 | 4/2019 | Crabtree et al. | |
| 10,404,748 B2 | 9/2019 | Parthasarathi et al. | |
| 10,554,680 B2* | 2/2020 | Ahmed | H04L 63/1433 |
| 10,594,714 B2 | 3/2020 | Crabtree et al. | |
| 10,601,845 B2 | 3/2020 | Ben Ezra et al. | |
| 2016/0241581 A1 | 8/2016 | Watters et al. | |
| 2017/0230399 A1* | 8/2017 | Ahmed | H04L 63/1408 |
| 2020/0076831 A1 | 3/2020 | Baughman et al. | |
| 2020/0076859 A1 | 3/2020 | Ng et al. | |
| 2020/0401704 A1* | 12/2020 | Bellis | G06N 20/00 |
| 2023/0004854 A1* | 1/2023 | Calmon | G06N 20/00 |

FOREIGN PATENT DOCUMENTS

| | | | | |
|---|---|---|---|---|
| WO | 2018027226 | | 2/2018 | |
| WO | WO-2019050557 A1 * | | 3/2019 | G06F 21/577 |
| WO | 2019144039 | | 7/2019 | |
| WO | WO-2020076219 A1 * | | 4/2020 | G06F 21/552 |

OTHER PUBLICATIONS

Goyal, P., et al., "Discovering Signals from Web Sources to Predict Cyber Attacks," IEEE Explore, Aug. 2018, https://mafiadoc.com/queue/discovering-signals-from-web-sources-to-predict-cyber-attacks_5cc5939e097c475d798b4673.html (accessed Jun. 10, 2020).

Subrahmanian, V. S., "CCAFE: The Country Cyber-Attack Forecasting Engine," 13th Annual Symposium on Information Assurance (ASIA'18), Jun. 5-6, 2018, Albany, NY, https://www.albany.edu/iasymposium/proceedings/2018/12-CCAFE.pdf (accessed Jun. 10, 2020).

Krakovsky, Y.M., et al., "Interval forecasting of cyberattack intensity on informatization objects of industry using probability cluster model," Journal of Physics Conference Series, May 2018, https://iopscience.iop.org/article/1 0.1088/1742-6596/1015/3/032088/pdf (accessed Jun. 10, 2020).

"BlueRISC to Develop Malware Prediction, Detection System Under DHS Contract," ExecutiveBiz, https://blog.executivebiz.com/2017/10/bluerisc-to-develop-malware-prediction-detection-system-under-dhs-contract/ (accessed Jun. 10, 2020).

"BAE wins IARPA contract to develop cyber-attack prediction technology," Army Technology News, Oct. 13, 2016, https://www.army-technology.com/news/newsbae-wins-iarpa-contract-to-develop-cyber-attack-prediction-technology-5031734 (accessed Jun. 10, 2020).

"Leidos Wins IARPA R&D Contract to Anticipate Cyberattacks Using Novel Sensors," Leidos website, https://investors.leidos.com/news-and-events/news-releases/press-release-details/2016/Leidos-Wins-IARPA-RD-Contract-To-Anticipate-Cyberattacks-Using-Novel-Sensors/default.aspx (accessed Jun. 10, 2020).

Zhan, Z., et al., "Predicting Cyber Attack Rates with Extreme Values," IEEE 2013, https://arxiv.org/pdf/1603.07432.pdf (accessed Jun. 10, 2020).

Jones M., et al., "Cyber-Attack Forecast Modeling and Complexity Reduction Using a Game-Theoretic Framework," Lecture Notes in Control and Information Sciences, vol. 449, 2013 Springer, Heidelberg, https://link.springer.com/chapter/10.1007/978-3-319-01159-2_4 (abstract accessed Jun. 10, 2020).

Okutan, Ahmet, et al., "Forecasting cyberattacks with incomplete, imbalanced, and insignifcant data", Cybersecurity, vol. 1, Article No. 15 (2018).

Bifet, Albert, et al., "MOA: Massive Online Analysis", Journal of Machine Learning Research 11 (2010) pp. 1601-1604.

Baena-Garcia, Manuel et al., "Early Drift Detection Method", ResearchGate Jan. 2006; https://www.researchgate.net/publication/245999704_Early Drift_Detection_Method/link/53e582cd0cf21cc29fd06017/download (accessed Jun. 10, 2020).

Hall, Mark A., Thesis "Correlation-based Feature Selection for Machine Learning", Department of Computer Science, the University of Waikato, Hamilton, New Zealand, Apr. 1999.

* cited by examiner

CYBERATTACK FORECASTING USING PREDICTIVE INFORMATION

CROSS REFERENCE

This application claims the benefit of the filing date of U.S. Provisional Patent Application No. 62/876,291, filed Jul. 19, 2019, which is hereby incorporated by reference in its entirety.

This invention was made with government support under grant number FA875016C0114 awarded by Office of the Director of National Intelligence (ODNI) and the Intelligence Advanced Research Projects Activity (IARPA). The government has certain rights in the invention.

FIELD

A system and method capable of predicting the probability of a cyberattack to a target entity from a plurality of signals of predictive information.

BACKGROUND

Forecasting cyberattacks before they occur is an important yet challenging task, as exploring early signs of an attack from a large volume of data is not trivial. The sophistication of cyberattacks penetrating enterprise networks has called for predictive defense beyond intrusion detection, where different attack strategies can be analyzed and used to anticipate next malicious actions, especially the unusual ones. Unfortunately, traditional predictive analytics or machine learning techniques that require training data of known attack strategies are not practical, given the scarcity of representative data and the evolving nature of cyberattacks. As we move towards predictive cyber-defense, cyberattacks need to be forecasted before their first malicious observables are seen, in order to take defensive measures more effectively.

If cyberattacks are forecasted a reasonable amount of time before they occur, defensive measures could be planned better to prevent their destructive effects. There are no known methods, models, or systems that currently forecast cyberattacks before first observables of a cyberattack are encountered in a targeted organization. The challenges lie in exploring early signs of an attack about to happen from a broad range of signals and data sources that may not directly and repeatedly be related to the attack itself. While many hypotheses have suggested what could be good early signs, there is no systematic way to combine or fuse a significant number of such signals, which individually may be weak but collectively could help forecast future cyberattacks.

Prior works use traffic data, intrusion detection alerts or other types of sensor data received from a network. Because they are using direct observables of cyber threats, it is not possible to forecast a cyber incident before its first observables are seen. Accordingly, the art lacks a system using unconventional signals which are not necessarily based on the observables of the actual cyberattacks within a target organization and enables forecasting cyberattacks before they are already underway.

SUMMARY

In accordance with one aspect of the present invention, there is provided a system capable of predicting the probability of a cyberattack to a target entity, including:

a non-transitory computer-readable medium having executable computer program logic embodied therein and a processor configured to execute the computer program logic including:

a signal collection unit capable of collecting a plurality of signals of predictive information to a target entity for a specific cyberattack type of interest;

a missing signal imputation unit capable of imputing a value for missing values of the collected signals;

a lagged signal selection unit capable of selecting a set of relevant non-redundant signals from the collected or collected signals supplemented with imputed signals to create lagged signals;

a concept drift analysis unit capable of identifying from the lagged signals relevant data chunks to form a custom training set of signals;

a ground truth repository unit capable of processing and storing historical cyberattack records comprising ground truth data relating to a plurality of cyberattack types and target entities; and a train forecasting model unit capable of training a forecasting model using the custom training set of signals together with selected ground truth data related to the specific attack type of interest for the target entity to generate a trained forecasting model, wherein a second set of signals of the same type of signals as the custom training set of signals (i.e., those signals used for a test period to train the model) is identified and inputted into the trained forecasting model to generate the probability of the specific attack type of interest against the target entity.

In accordance with another aspect of the present disclosure, there is provided a computerized method for predicting the probability of a cyberattack to a target entity, including:

providing a processor configured to execute program logic embodied in a non-transitory computer-readable medium, including:

collecting a plurality of signals of predictive information to a target entity for a specific cyberattack type of interest;

optionally, imputing a value for missing values of the collected signals; selecting a set of relevant non-redundant signals from the collected or collected signals supplemented with imputed signals to create lagged signals;

identifying from the lagged signals relevant data chunks to form a custom training set of signals;

providing selected ground truth data related to the specific attack type of interest for the target entity;

training a forecasting model using the custom training set of signals together with the selected ground truth data related to the specific attack type of interest for the target entity to generate a trained forecasting model;

providing a second set of signals of the same type of signals as the custom training set of signals (i.e., those signals used for a test period to train the model); and generating the probability of the specific attack type of interest against the target entity by inputting the second set of signals into the trained forecasting model.

These and other aspects of the present disclosure will become apparent upon a review of the following detailed description and the claims appended thereto.

DETAILED DESCRIPTION

Figure 1:
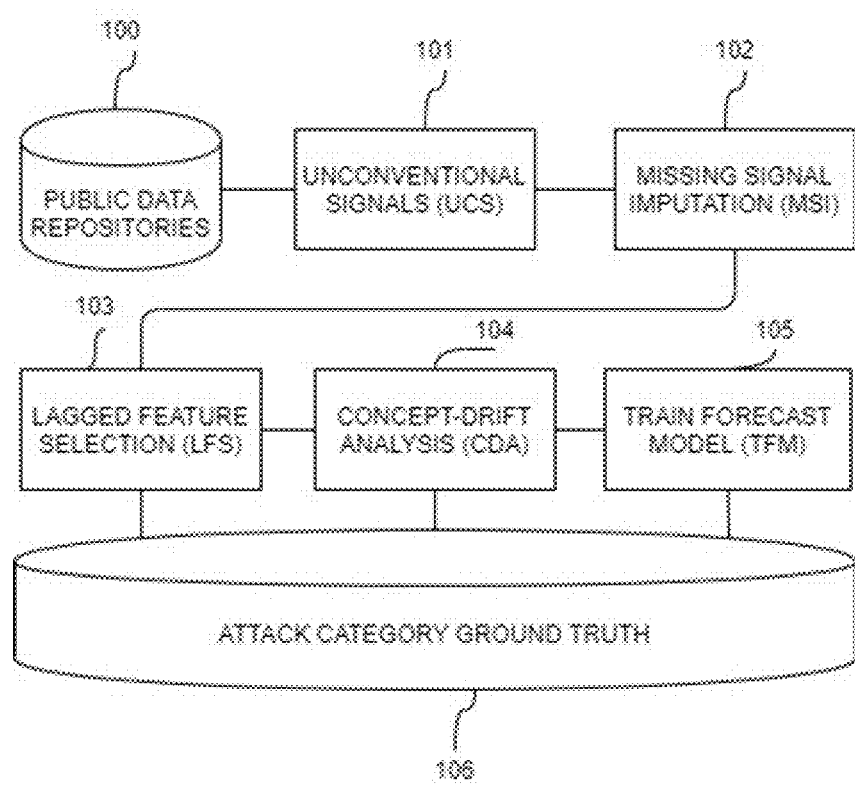
FIG. 1 is a flow chart depicting a high-level overview of the cyberattack forecasting system in accordance with an embodiment of the present invention.

This invention relates to an automated system which uses a broad range of weakly correlated unconventional signals derived from various sources to forecast a cyberattack towards any given target organization or entity. A cyberattack is known in the art and includes, but is not limited to, any type of offensive cyber activity executed by a malicious actor or group of malicious actors that targets computing infrastructures, networks, and/or devices in a target entity. The signals are predictive signals in that the information is observed prior to an actual cyberattack event. Thus, the predictive information precedes a later experienced attack or attack event. The system includes approaches to select relevant and significant, but not redundant lagged signals and treats the non-stationary relationships between those signals and the cyberattack occurrences. The system provides insights to human analysts regarding which lagged signals have a higher contribution to a forecasted confidence value.

This invention describes a system architecture that is capable of forecasting cyberattacks using a plurality of signals with unknown predictive significance to a given target organization or entity for a given attack type of interest. Suitable predictive signals include signals external to the target organization, and thus can be referred to as "unconventional" in the community. Signals external to the target entity are signals outside of the computing infrastructure of the target entity. Specific external signals include public reaction to the stated policy of an organization; level of sentiment against the entity on social media; reaction to public announcements of the entity; disclosure of vulnerabilities to newly published systems of the entity; level of interest or number of mentions of the entity; or the like. Optionally, the system can further incorporate signals internal to the target entity. Signals internal to the target entity are signals within the computing infrastructure of the target entity. Specific internal signals include the number of mobile devices with Internet access; the number of exploitable Common Vulnerabilities and Exposures (CVE) in the internal systems, networks or other potential assets; the volume of data packets transmitted; or the like. The predictive signals can be derived from various data sources in the open domain, such as public or private sources. The signals can be derived from various data sources in the public domain, such as Twitter; GDELT; open threat exchange (OTX); Google Safe; ExploitDB; Virusign; or the like. The signals can be derived from various data sources in the private domain, such as STINGAR at Duke; dark web data providers like darkowl and echosec; or the like. Another example of a private domain source includes a sub-contractor of a target entity who is doing social media sentiment analysis for the entity.

A feature of the system architecture lies in how it integrates several components, each enhanced from existing technologies, to deal with the challenges of incomplete data, insignificant signals, and non-stationary signal-ground truth relationships.

The system can forecast a cyberattack against a target entity, such as, but not limited to a private, public or government institution, small, medium or large size organization or company, or an individual or group of individuals.

Forecasted cyberattack types include but are not limited to malicious email, endpoint malware (malicious script injection), denial-of-service (DoS), defacement, brute-force/credential stuffing, phishing, account hijacking, cyber-crime, cyber espionage, cyber warfare, or hacktivism.

Incomplete Data: Real world open-domain signals may not produce values all the time due to various reasons. There might be discontinuities in the sensors/data sources or there might be no measurements at all.

Insignificant Signals: Signals derived from a broad range of open data sources may or may not be relevant to the cyberattack events. Even if a signal is relevant, determining its significant time lags with respect to the cyberattack occurrences is nontrivial.

Non-stationary Signals and Ground Truth: Relations between the signals and real cyber incidents (ground truth) are likely to change over time in an unforeseen way. The present systematic and robust method can automatically account for such changes.

FIG. 1 shows a high-level overview of an embodiment of the system of the present invention. The system uses unconventional signals 101 which are external to the corporate network, it contains a process to impute missing signals 102, a process to perform lagged feature selection 103, a process to perform concept drift analysis 104, and a process to train a forecasting model to predict cyberattacks 105. The architecture is supported by a database containing public data repositories 100 and a set of historical ground truth cyberattacks 106. The present system trains a forecasting model which can forecast cyberattacks up to N days before they happen where N is a configurable parameter in the system and produces a confidence value for each forecast.

Public Data Repositories 100: For a given a target organization (CorpX) and attack type (A), the system pulls M daily aggregated signals from open source repositories, such as: Twitter; the GDELT Project; OTX alienvault; open interfaces of popular anti-virus programs like virus-update-history of Avast; Google Safe; Exploit DB; and Virusign.

Unconventional Signals (UCS) 101: Examples of the types of signals pulled from each of these open sources are summarized in Table 1.

TABLE 1

| Main signal sources and signals | |
|---|---|
| Signal Source | Summary |
| Twitter | Mention counts for the target organization(s) |
| GDELT | The number of mentions of the given target organization(s) |
| GDELT | Instability scores of different regions in the world |
| OTX | The number of Open Threat Exchange (OTX) pulses |
| Avast, Kaspersky | Daily counts of infection events |

TABLE 1-continued

Main signal sources and signals

| Signal Source | Summary |
|---|---|
| Google Safe | Counts of compromised sites, malware and phishing events |
| Exploit DB | The daily number of exploits |
| Virusign | Daily counts of samples in Virusign |

Missing Signal Imputation (MSI) 102: To deal with incomplete data, the system is able if needed to impute each missing value of a signal at time t with a variety of methods including imputation with cumulative mean (or cumulative mean of a moving window), imputing with regression or interpolation or using a predictive imputation approach as described in A. Okutan, G. Werner, S. J. Yang, and K. McConky, Forecasting Cyberattacks with Incomplete, Imbalanced, and Insignificant Data, Cybersecurity, 1(1):15, December 2018, which is incorporated herein in its entirety. The experimental results provided below are based on the method using the cumulative mean of a moving window. While simple, it is effective and matches well with the data properties that are changing over time.

Lagged Feature Selection (LFS) 103: This process selects a set of relevant yet non-redundant features from M signals with up to N-day lags (i.e., N×M feature values). It evaluates the worth of signal lags by considering highest correlation with the target feature (the ground truth) while ensuring least redundancy among the predictive features. The correlation between any two features can be calculated using a correlation coefficient (e.g., Pearson Correlation Coefficient or Information Gain (Symmetrical Uncertainty)). The set of results provided in the experimental section are based on LFS that is using the symmetrical uncertainty-based information gain approach.

Concept Drift Analysis (CDA) 104: This component automatically discovers the changes in how unconventional signals are related to the cyber incidents and adjusts the system to train the forecasting model. Concept Drift Analysis (CDA) is a generic process that can use a variety of drift detection methods implemented in Machine Learning for Data Streams (MOA), as described in Albert Bifet, Geoff Holmes, Richard Kirkby, Bernhard Pfahringer (2010); MOA: Massive Online Analysis; Journal of Machine Learning Research 11: 1601-1604 which is incorporated herein in its entirety, to identify the change points in the cumulative training data, and use a process to pick the most relevant data chunks to form a custom training set for a forecast model. The results provided in the experimental section are based on the Concept Drift Analysis that is using the Early Drift Detection Method (EDDM)), as described in Manuel Baena-Garcia, Jos Campo-Avila, Raul Fidalgo, Albert Bifet, Ricard Gavalda, and Rafael Morales-Bueno, Early Drift Detection Method, in fourth international workshop on knowledge discovery from data streams, page 7786, 01 2006 which is incorporated herein in its entirety.

Train Forecasting Model (TFM) 105: This component trains a forecasting model to predict the probability of a specific attack type against a specific target entity. A single entity may have many trained forecasting models, one for each cyberattack type of interest in predicting. In an embodiment, a first set of signals (training set of signals) is used to generate a trained forecasting model. A second set of signals of the same type of signals as the first set of signals (i.e., those signals used for a test period to train the model) is input into the trained model to generate the probability of the specific attack type of interest against the target entity. In an embodiment, the signals from the second set of signals can be the same as, different from or overlap with the signals from the first set of signals.

Attack Category Ground Truth 106: This component is a ground truth repository. The ground truth is composed of a series of historical attack records minimally characterized by a timestamp, attack type and target entity.

Figure 2:
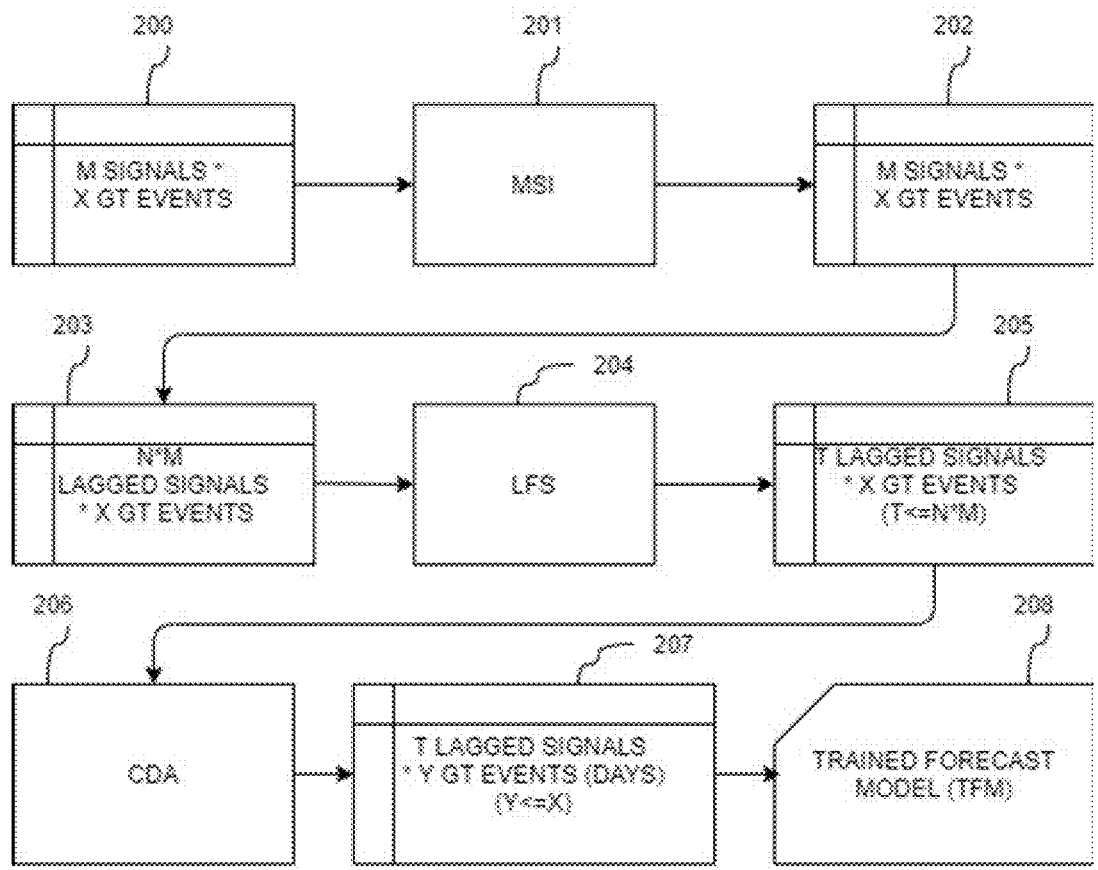
FIG. 2 is a flow chart depicting an embodiment of data flow in the system.

FIG. 2 provides details on the data dimensions and transformations of an embodiment of the system. Using derived signals and X daily aggregated counts of cyberattack events of type A towards CorpX over a period of time 200, the system forecasts cyberattacks (of type A) 208 towards CorpX for the next D days. During the MSI phase 102|201, missing signal values are imputed with cumulative means, resulting in the same M signal by X GT event 202 dimensions as 200. When the system is configured to consider a maximum lag of N days for each signal, a dataset composed of N*M lagged signals and X ground truth events 203 is generated. T of these N*M lagged signals 205 are selected at the end of the LFS process 103|204 where T<=N*M. Then, Concept Drift Analysis 104|206 is used to select a subset of the cumulative data (Y days of the T lagged signals and ground truth) for training. A forecast model is trained using Y days of T signals 207 and CorpX ground truth for attack type A 208. For any given date, providing T signals as input, the system outputs the probability of observing a cyberattack of type A towards CorpX for each of the next D days. Furthermore, it outputs the relative importance of the signals while generating the forecasted probability (confidence). The data flow of an embodiment of the system is summarized in FIG. 2.

Important features of the system include:

Evaluating a plurality of weakly correlated signals: Using LFS 103|204|306, the system selects signals that are relatively more correlated with the ground truth while having low inter-correlation among themselves. Evaluating M signals and N lags, the system selects significant lags of M signals and uses them with organizational ground truth for a given attack type, to train a forecast model.

Forecasting cyberattacks for the next D days 311: the system is able to predict the probability of a given cyberattack type for each of the next D days, where D is a configurable input parameter. It uses signals with lag > or =d while forecasting attacks for the d th day from the prediction date where l< or =d< or =D.

Dialing Functionality: the system uses a tunable dynamic warning threshold (Ω) towards dial-functionality 302. It is possible to tune the system to be more or less aggressive in generating warnings for a specific cyberattack type towards a target organization. Basically, if the forecasted cyberattack probability (confidence) is larger than the configured warning threshold, a cyberattack warning is issued. Otherwise, no warnings are issued, because the forecasted number of attacks is zero.

Signal Provenance: the system outputs a likelihood score (between 0 and 1) for each lagged signal indicating its relative contribution to the forecasted attack confidence 312. If a Bayesian classifier is used, these scores are derived from the likelihoods of the lagged signal value in the corresponding conditional probability table (of that signal) in the underlying forecast model. For each lagged signal, the average of these likelihoods for one or more attacks is used as an approximate measure for the relative contribution of the lagged signal to the overall attack confidence, i.e., the probability of observing one or more cyberattacks 313.

Figure 3:
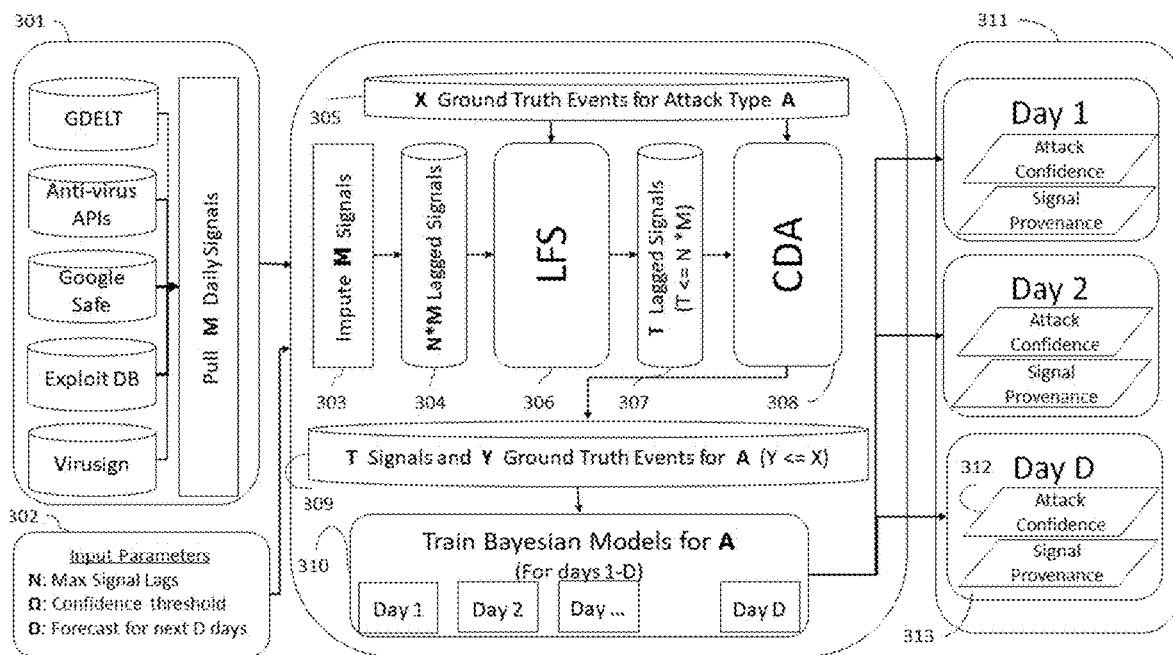
FIG. 3 is a flow chart depicting a cyberattack forecasting system in accordance with an embodiment of the present invention.

The inputs, outputs and inner modules of an embodiment of the system that is used to predict cyberattacks of type A, during each of the next D days are shown in FIG. 3. First, M daily aggregated signals are pulled from the open public repositories such as GDELT, Google Safe, Exploit DB, and Virusign and open anti-virus API's 301. When the maximum number of lags (days) to consider is N for each of the M signals, missing signal values are imputed 303 to derive N*M imputed signals 304. Assuming X days of ground truth data 305 are provided for a given attack type A, LFS 306 and CDA 308 processes are applied to T Lagged Signals 307 to derive a final data set of T signals and Y days 309 to train a model to forecast cyberattacks (of type A) where X< or =Y and T< or =N*M.

After the LFS and CDA processes are applied, a model is trained for each of the next D days, where a lagged signal is used in a model to forecast day d, only if its lag is greater than or equal to D 310. Once fed with M signals, and the confidence threshold Q, the system outputs the cyberattack confidence, i.e., the probability of observing more than zero attacks (of type A) and the signal provenance for each of the next D days 311. If the forecasted confidence value for a day 312 is greater than or equal to Q, then a warning is issued for the target organization for that day, to enable the organization to take necessary defensive measures beforehand.

FIG. 3 shows Inputs, Outputs and Main Modules of an embodiment of the system to forecast cyberattacks of type A, for each of the next days between 1 and D, using M signals and a confidence threshold value of $\Omega$.

Figure 4:
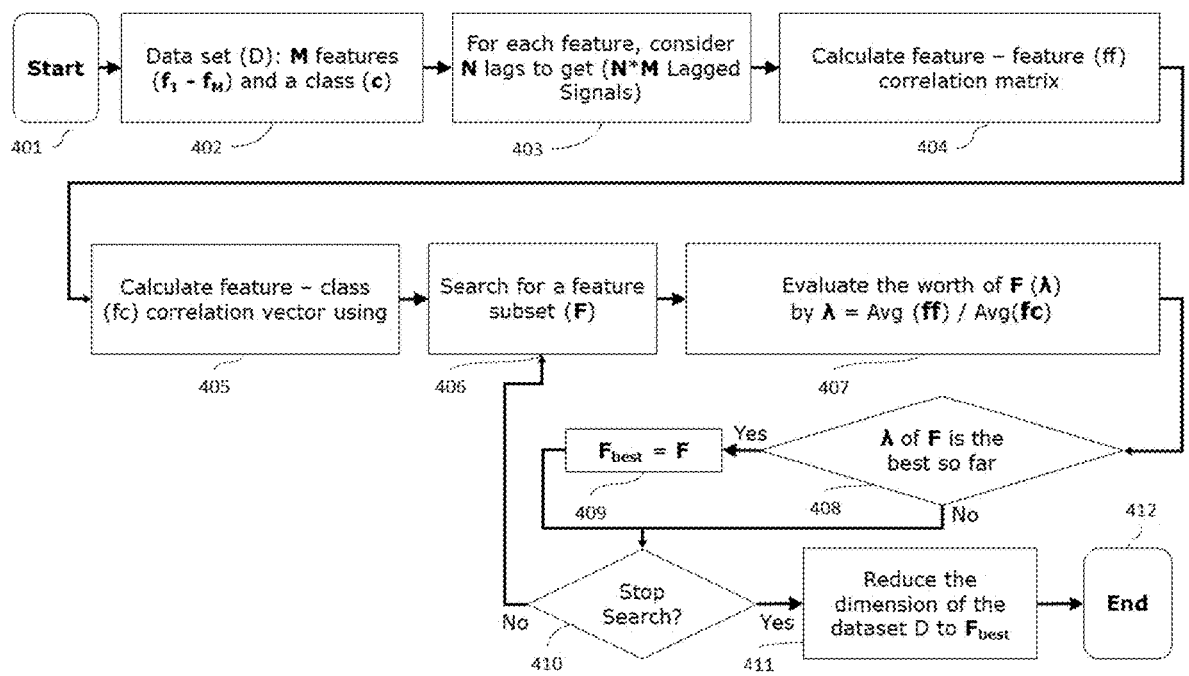
FIG. 4 is a flow chart depicting an embodiment of the Lagged Feature Selection Process.

Lagged Feature Selection (LFS). While using unconventional signals to forecast cyberattacks, there is an uncertainty regarding which aggregation period should be used. Are signals in a day relevant with cyberattacks next day? What about the signals from three days, one week or one month ago? If there are multiple relevant lags for a signal, how should they be aggregated? Instead of using a naïve approach to select a predefined aggregation period, this invention proposes a generic Lagged Feature Selection (LFS) 2041306 to provide a systematic way to select significant signal lags. LFS is based on the idea that a good set of signals should be highly correlated with the ground truth but be as uncorrelated as possible within itself. To start 401 let D be a dataset, composed of M features ($f_1$-$f_M$) and a class (c) 402, for each feature $f_1$ in D, we add N lagged signals $f_1$-$f_N$ to D to generate N*M total lagged signals 403. The correlation between any two features can be calculated using a correlation coefficient (like Pearson Correlation Coefficient) or Information Gain (Symmetrical Uncertainty). Results provided in Section D are based on LFS which uses Symmetrical Uncertainty (SU) to calculate the information gain of a signal when considered together with another signal 404 or ground truth 405. The merit of a subset of signals is calculated using the CfsSubsetEval feature selection algorithm, as described in M. A. Hall. Correlation-based Feature Subset Selection for Machine Learning. PhD thesis, University of Waikato, Hamilton, New Zealand, 1999 which is incorporated herein in its entirety, with the BestFirst search option. A subset which includes signals which are highly correlated with the ground truth, but loosely correlated among themselves is selected at the end 412 of the feature selection process 406 407 408 409 410 411 and the most significant lagged signals are found. The details of the generic LFS process is illustrated in FIG. 4.

Concept Drift Analysis (CDA). Cyberattack occurrences are sporadic and the relationships between the signals from unconventional sources and entity ground truth are changing over time. Due to the non-stationary nature of the unconventional signals and entity ground truth data, more data may not be always good for model training. Therefore, Concept Drift (CD) is used to identify the change points in the training set of each attack type and dynamically determine a training window. CDA is a generic process that can use a variety of drift detection methods, to identify the change points in the cumulative data, and use a novel heuristic to pick the most relevant data chunks to form a custom training set for each forecast model.

Figure 5:
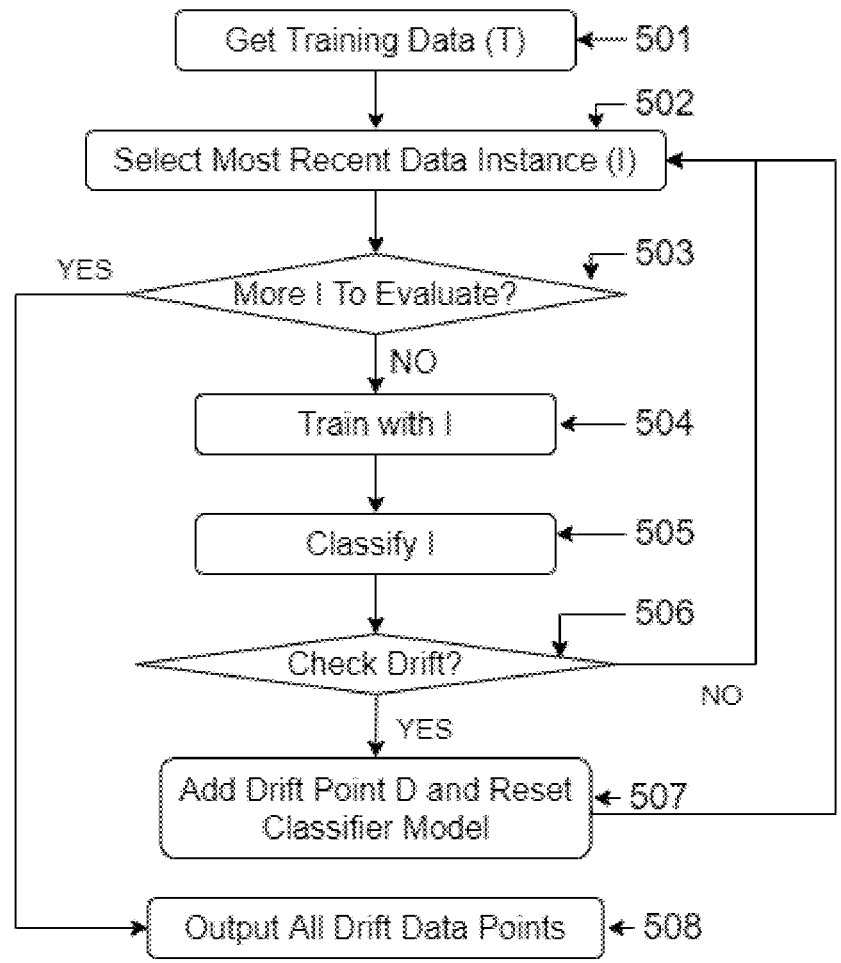
FIG. 5 is a flow chart depicting an embodiment of the CDA Change Point Detection Process.

CDA uses a drift detection method to find the change points in the cumulative data sets. Each data set is traversed backwards starting from the end of the training period, in order to identify newer data chunks which are closer to the test period first. FIG. 5 shows the process of an embodiment of the CDA drift point detection method. Upon receiving the entire cumulative data T for training 501, the system extracts the most recent data instance I not yet evaluated in T 502. If I exists 503, it trains and updates the classifier model with I 504 and makes a prediction for it 505. It checks the distribution of the distances between classification errors to detect drifts 506. If there is a concept drift, the system adds a draft point at I 507 and resets the classifier model. Note that the described drift prediction process can work with various ways to define how performance indicates concept drifts. This process repeats until all cumulative data instances in T are evaluated, and all the Drift Points are output 508.

Figure 6:
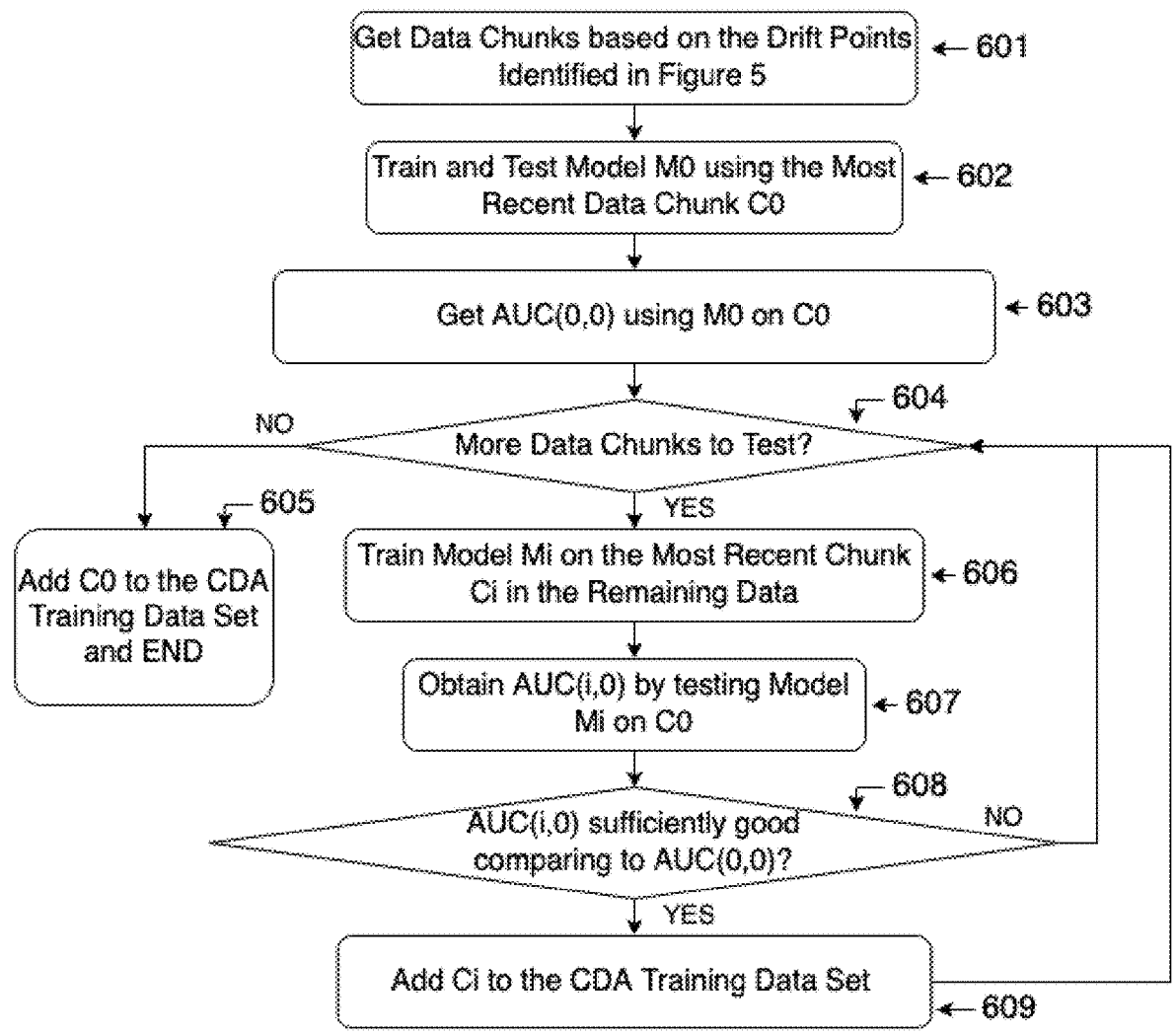
FIG. 6 is a flow chart depicting an embodiment of the CDA Chunk Selection Process.

FIG. 6 shows an embodiment of the CDA Training Data Chunk process that selects the training data chunks based on the Drift Points identified. First, the cumulative training data T is separated based on the Drift Points identified 601. A baseline model M0 is trained and tested using the most recent data chunk C0 602, that is, the data set that starts with the most recent data instance and ends before the first Drift Point identified. Using M0 to classify all data points in C0 gives the baseline AUC (Area Under the ROC Curve) performance AUC(0,0) 603. The system continues with the next most recent data chunk 604 until no remaining data in T, which will include C0 as part of the CDA training data and end the process 605. For each of the remaining data chunks Ci, the system trains a classifier model Mi 606 and obtains the AUC performance AUC(i,0) by testing Mi on C0 607. The system then compares the AUC(i,0) with the baseline AUC (0,0) 608. If AUC(i,0) is sufficiently comparable or better than AUC (0.0), the system adds Ci to the CDA training set 609. While getting the experimental results provided below, a data chunk Ci was added to the CDA if |AUC(i,0)-AUC(0,0)|<=0.2.

Signal Relevance. Signal provenance helps to find out the relative contribution of each signal to a forecasted confidence value. The developed system is configurable to use any Machine Learning classifier, however, using a Bayesian classifier helps to represent the uncertainties in the given data well and address the challenge of interpreting the forecasted confidence values through signal provenance. A naïve Bayesian classifier is used to forecast the probability of observing one or more attacks. The attack counts are categorized (like Zero, Few, Several and Many) and the probability of each category is forecasted. Signal provenance provides a likelihood score (between 0 and 1) for each lagged signal indicating its relative contribution to a forecasted confidence.

The disclosure will be further illustrated with reference to the following specific examples. It is understood that these examples are given by way of illustration and are not meant to limit the disclosure or the claims to follow.

Example 1

The calculation of the posterior of each class value (confidence) and the derivation of the provenance information are illustrated for a simple example where two signals are used in a naïve Bayesian model. The likelihoods of each signal retrieved from their conditional probability table (CPT), based on their values are shown in the first two columns of Table 2. The columns "Likelihood from CPT1" and "Likelihood from CPT2" show the likelihoods of signal 1 and 2, respectively for each class. Class prior probabilities represent the distribution of the classes in the training set. The posterior of each class in "Posterior of Classes" column is calculated by multiplying the likelihood of each signal for that class and the class prior. These probabilities are then normalized to derive the final normalized posteriors for each class. In this specific example, the probability of observing one cyberattack is 0.423, and the probability for one or more cyberattacks is the sum of the posteriors for classes Few, Several and Many (0.60). Signal provenance of each signal for observing one or more cyberattacks is calculated by the average of its likelihoods for one or more attacks. In this specific example, the signal provenance will output 0.48 and 0.69 for signal 1 and signal 2, respectively.

TABLE 2

A simple example to illustrate the calculation of the cyberattack confidences for a set of classes

| Classes | Likelihood from CPT1 | Likelihood from CPT2 | Class Priors | Posterior of Classes | Normalized Posteriors |
|---|---|---|---|---|---|
| Zero | 0.240 | 0.100 | 0.425 | 0.010 | 0.056 |
| Few | 0.800 | 0.200 | 0.485 | 0.078 | 0.423 |
| Several | 0.400 | 0.920 | 0.086 | 0.032 | 0.173 |
| Many | 0.250 | 0.950 | 0.004 | 0.001 | 0.005 |

Figure 7:
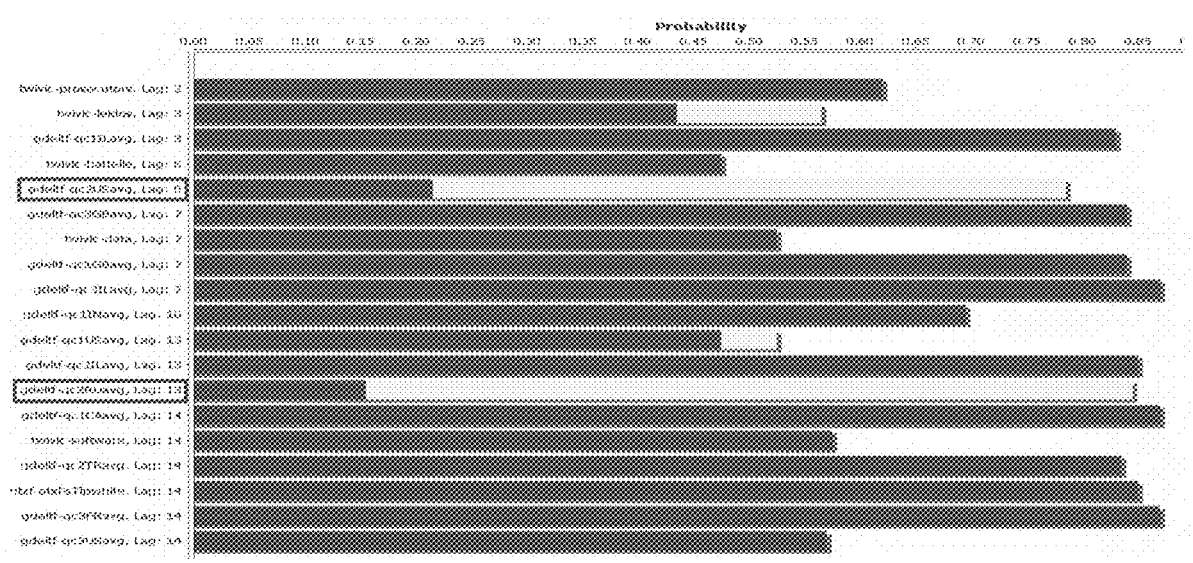
FIG. 7 is a signal provenance bar chart.

For each forecasted confidence, the system shows the changes in the amount of the contribution of a signal compared to a previous day to indicate which signal value leads to a change in the overall confidence if any. The example signal provenance bar chart provided in FIG. 7 shows the significant decreases in the contribution of two highlighted lagged signals where the light green part of the bars shows the amount of the decrease when compared to the previous day.

The system generates daily cyberattack confidences and signal provenance information which reveals the importance of signals for a target organization and attack type. It provides a tunable dynamic warning threshold towards dial-functionality which enables the ability to be more or less aggressive in warning generation.

The system generates bar charts for each forecasted attack type of a given target organization. The plotted bars in each chart are colored to indicate whether the forecast represents a true positive (TP), false positive (FP), true negative (TN) or false negative (FN) when compared to the real ground truth. The colors represent TP, TN, FN, and FP forecasts, respectively. A FP forecast is considered less important than a FN one. Similarly, a TN forecast is less important than a TP one. Therefore, a bar chart with more less important colors and fewer important colors is better.

Figure 8:
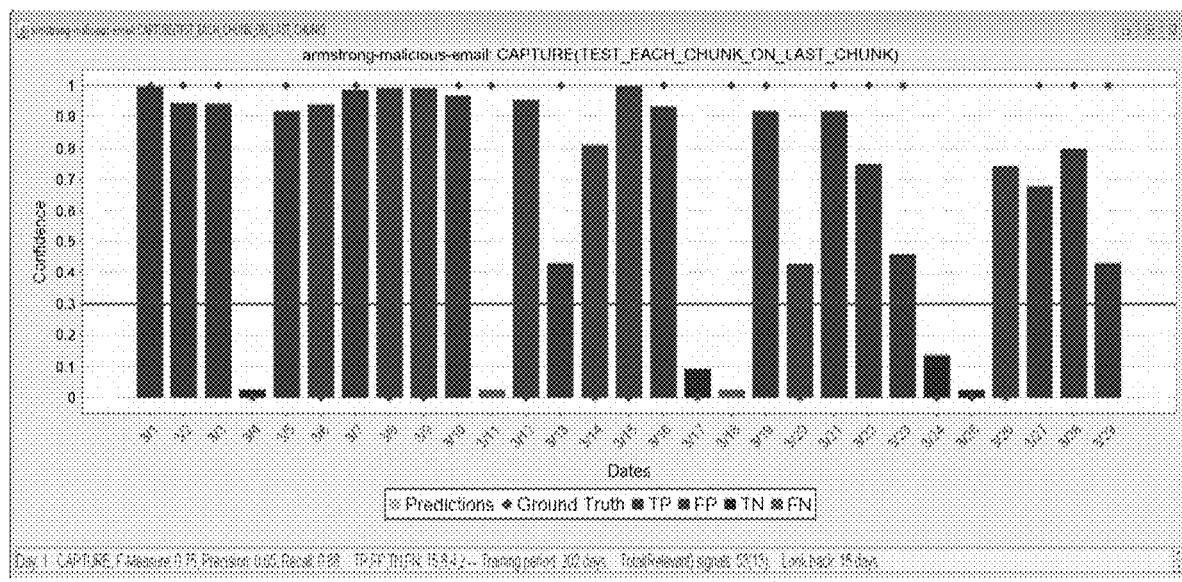
FIG. 8 is an output chart of Example 1.

A configurable confidence threshold is used for each attack type, to decide whether a cyberattack warning should be issued or not. The confidence threshold ($\Omega=0.3$) is shown with a horizontal red line and if the forecasted confidence is greater than or equal to the defined threshold, a cyberattack warning is issued. The occurrence of a cyberattack (ground truth) is shown with a red diamond shape for each day where a diamond shape on 1 indicates that the number of attacks observed is greater than or equal to 1 for the corresponding day. An example of the system output for a target organization and attack type is shown in FIG. 8, which shows the daily forecasted confidence values for a target organization named Armstrong and the attack type labelled malicious email.

Given a set of previously observed cyber incidents of a specific attack type (ground truth), the system can be used by any target organization to forecast future cyber incidents of the same type.

The system forecasts cyberattack towards a target organization before any malicious observables are seen, therefore there is always more time to strengthen the defense systems and take additional measures. The system uses any weakly correlated, conventional or unconventional signals that may or may not be related to the target entity to forecast cyberattacks towards it.

The system provides an integrated approach to treat the challenges for cyberattack forecasting. For successful forecasting, all these challenges should be treated well, through a systematic feature engineering and training set selection process. This invention develops a Lagged Feature Selection (LFS) approach and a Concept Drift Analysis (CDA) method to treat the aforementioned challenges.

Cyberattack forecasting involves machine learning challenges which require elegant methodological and theoretical handling. The present system has treated these challenges and proposed an integrated solution to consider them at the same time. The system is treating these challenges using approaches developed at the end of a long research, development and experimentation process. It is using a feature selection approach which is helping to select significant signal lags, not just the significant signals. Furthermore, for each trained model, a customized and novel heuristic is being proposed to select more relevant data chunks in the historical (cumulative) data.

While using weakly correlated external signals to forecast cyberattacks, there is an uncertainty regarding which aggregation type and period should be used. Are signals in a day relevant with cyberattacks next day? What about the signals from three days, one week or one month ago? If there are multiple relevant lags for a signal, how should they be aggregated? Instead of using a naive approach to select a predefined aggregation period, this invention proposes LFS to provide a systematic way to select the significant lagged signals. LFS is based on the idea that a good set of signals should be highly correlated with the ground truth but be as uncorrelated within itself as possible.

Cyberattack occurrences could be sporadic and the relationships between the signals from unconventional sources and entity ground truth may be changing over time. Due to the non-stationary nature of the unconventional signals and entity ground truth data, more data may not always be good for model training. Therefore, this invention uses an innovative Concept Drift Analysis (CDA) process to identify the change points in the training set of each attack type and dynamically determine a training window.

This invention develops an integrated approach which treats the key challenges of cyberattack forecast at the same time in an innovative way. The developed system is generic, robust and configurable to adapt to different use cases.

Furthermore, it is resilient to the changes in the relationships of features and the ground truth and the changes in the significant signal lags. It forecasts cyberattacks up to N days before they are observed where N is a configurable parameter and helps cybersecurity professionals to have a reasonable amount of time to take necessary defensive measures before a cyber incident is observed.

Example 2

The results of the experiments showing that the present system performs better than an ordinary comparative Bayesian approach (named BayesNet) are provided below:

Used daily categorical attack count ground truth of a target organization named Knox for the Endpoint Malware and Malicious Email attack types between 11/16/16 and 3/29/18

Ground truth categories used are Zero: 0, Few: 1, Several: 2, Many: 3. The category "Few" is used when the observed number of attacks was between 1 and 3. The category "Several" is used when the number of attacks is between 4 and 10. And the category "Many" was used when the number of attacks was more than 10.

Used 843 daily aggregated signals from open source repositories. For each signal, the maximum lag was considered to be 15 days.

Trained and tested two models for each target organization and attack type, one for the comparative baseline and one for the present system.

The comparative baseline model is an ordinary BayesNet with Missing Signal Imputation (MSI) where signals are aggregated over the last 3 days.

The present system model uses Missing Signal Imputation and the LFS, and CDA methods. MSI uses imputation with the cumulative mean of a moving window. LFS uses the symmetrical uncertainty to find the correlation between two features. CDA uses EDDM drift detection method to find the change points in a cumulative training data set.

The present system identifies change points in the historical data and selects data chunks that have AUC (Area Under the ROC Curve)>=(AUC11-α) when tested on the most recent chunk where AUC11 is the AUC when a model trained and tested with the most recent data chunk and a is set to 0.20.

The last two months of data, i.e., February and March 2018 were used for testing. Each model outputs the attack confidence and the relevant signals for each forecast during each test period. The probability of seeing an attack is considered 1 minus the probability of zero attacks.

Figure 9:
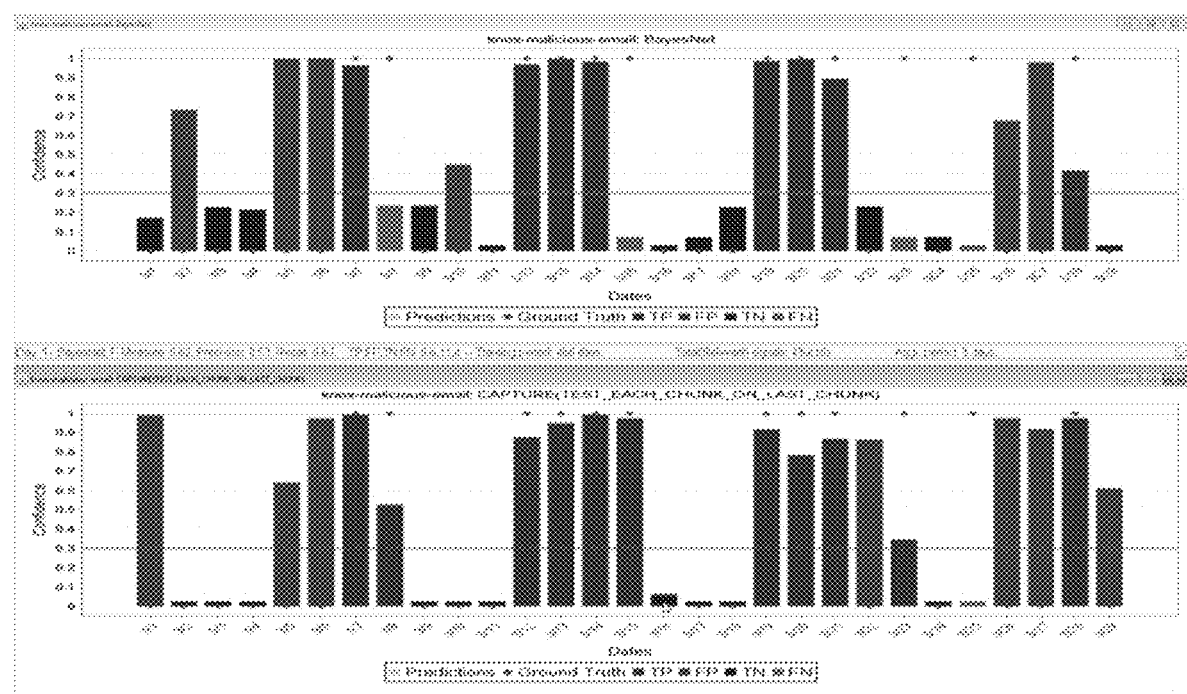
FIG. 9 shows daily forecasts generated in Example 2 of a comparative baseline system and the system of in accordance with the present invention.

The F-Measure values of the baseline and the present system are provided in Table 1. Furthermore, the daily forecasts of the comparative baseline system and the present system for the March-2018 test period are shown in FIG. 9.

The present system (lower plot) generates more true positives and less false negatives compared to the baseline system whose daily forecasts are shown in the upper plot.

TABLE 3

F-Measure values for the comparative baseline system and the present system

|  | Feburary-18 | | March-18 | |
| --- | --- | --- | --- | --- |
|  | Endpoint Malware | Malicious Email | Endpoint Malware | Malicious Email |
| BayesNet | 0.66 | 0.45 | 0.44 | 0.62 |
| CAPTURE | 0.68 | 0.47 | 0.62 | 0.73 |

This invention develops a configurable prototype system in Java. Provided with the previously observed ground truth events of a certain attack type for a given target organization, it can forecast future cyber incidents of that attack type towards the organization.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A system capable of predicting the probability of a cyberattack to a target entity, comprising:
    a non-transitory computer-readable medium having executable computer program logic comprising the following steps:
    collecting a plurality of predictive signals to a target entity for a specific cyberattack type of interest;
    imputing a value for missing values of the collected signals;
    selecting a set of relevant non-redundant signals from the collected or collected signals supplemented with imputed signals to create lagged signals;
    identifying from the lagged signals relevant data chunks to form a custom training set of signals;
    processing and storing historical cyberattack records comprising ground truth data relating to a plurality of cyberattack types and target entities; and
    training a forecasting model using the custom training set of signals together with selected ground truth data related to the specific attack type of interest for the target entity to generate a trained forecasting model,
    wherein a second set of signals of the same type of signals as the custom training set of signals is identified and inputted into the trained forecasting model to generate a probability of the specific attack type of interest against the target entity.

2. The system of claim 1, wherein the plurality of predictive signals is internal, external or combination thereof to the target entity.

3. The system of claim 1, wherein imputing a value for missing values of the collected signals comprises imputation with a cumulative mean or cumulative mean of a moving window, imputing with regression or interpolation, or using a predictive imputation approach.

4. The system of claim 1, wherein creating lagged signals evaluates the worth of signal lags by considering highest correlation with a target signal while ensuring least redundancy among predictive signals.

5. The system of claim 1, wherein forming a custom training set of signals uses drift detection methods implemented in machine learning for data streams.

6. The system of claim 1, wherein the historical cyberattack records are composed of a series of historical cyberattack records comprising a timestamp, attack type and target entity.

7. The system of claim 1, wherein training the forecasting model uses the signals identified by the lagged signal selection unit in the data chunks detected by the concept drift analysis unit, and the ground truth derived by the ground truth repository unit.

8. The system of claim 1, wherein the plurality of signals is collected from public, private or combination thereof domain information.

9. The system of claim 1, wherein signals from the second set of signals are the same as, different from or overlap with signals from the custom training set of signals.

10. A computerized method for predicting the probability of a cyberattack to a target entity, comprising:
providing a processor configured to execute program logic embodied in a non-transitory computer-readable medium, comprising:
collecting a plurality of predictive signals to a target entity for a specific cyberattack type of interest;
optionally, imputing a value for missing values of the collected signals;
selecting a set of relevant non-redundant signals from the collected or collected signals supplemented with imputed signals to create lagged signals;
identifying from the lagged signals relevant data chunks to form a custom training set of signals;
providing selected ground truth data related to the specific attack type of interest for the target entity;
training a forecasting model using the custom training set of signals together with the selected ground truth data related to the specific attack type of interest for the target entity to generate a trained forecasting model;
providing a second set of signals of the same type of signals as the custom training set of signals; and
generating a probability of the specific attack type of interest against the target entity by inputting the second set of signals into the trained forecasting model.

11. The method of claim 10, wherein the plurality of predictive signals is internal, external or combination thereof to the target entity.

12. The method of claim 10, wherein the plurality of signals is collected from public, private or combination thereof domain information.

13. The method of claim 10, wherein imputing the missing signal includes imputation with a cumulative mean or cumulative mean of a moving window, imputing with regression or interpolation, or using a predictive imputation approach.

14. The method of claim 10, wherein the lagged signals are created by evaluating the worth of signal lags by considering highest correlation with a target signal while ensuring least redundancy among predictive signals.

15. The method of claim 10, wherein the custom training set of signals is formed by using drift detection methods implemented in machine learning for data streams.

16. The method of claim 10, wherein the selected ground truth data is composed of a series of historical cyberattack records comprising a timestamp, attack type and target entity.

17. The method of claim 10, wherein training the forecasting model is capable of training a forecasting model by using the signals identified by the lagged signal selection unit in the data chunks detected by the concept drift analysis unit, and the ground truth derived by the ground truth repository unit.

18. The method of claim 10, wherein signals from the second set of signals are the same as, different from or overlap with signals from the custom training set of signals.

* * * * *